US007454483B2

(12) United States Patent
Soluk et al.

(10) Patent No.: US 7,454,483 B2
(45) Date of Patent: Nov. 18, 2008

(54) METHOD AND APPARATUS FOR CONFIGURING SERVERS

(75) Inventors: Kirk Soluk, Bellevue, WA (US); Praerit Garg, Kirkland, WA (US); Vishnu A. Patankar, Kirkland, WA (US); Jin Huang, Bellevue, WA (US); Xiaohong Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 10/438,290

(22) Filed: May 14, 2003

(65) Prior Publication Data

US 2004/0230639 A1 Nov. 18, 2004

(51) Int. Cl.
*G06F 15/177* (2006.01)

(52) U.S. Cl. ...................................... 709/220; 709/226

(58) Field of Classification Search ................ 709/220, 709/226; 706/12, 14, 16, 46, 45, 50, 59
See application file for complete search history.

(56) References Cited

U.S. PATENT DOCUMENTS

| | | | | |
|---|---|---|---|---|
| 5,596,723 | A * | 1/1997 | Romohr | 709/222 |
| 5,819,030 | A | 10/1998 | Chen et al. | |
| 6,212,558 | B1 | 4/2001 | Antur et al. | |
| 6,308,188 | B1 | 10/2001 | Bernardo et al. | |
| 6,434,607 | B1 | 8/2002 | Haverstock et al. | |
| 6,466,972 | B1 | 10/2002 | Paul et al. | |
| 6,493,752 | B1 | 12/2002 | Lee et al. | |
| 6,567,849 | B2 | 5/2003 | Ludovici et al. | |
| 6,711,686 | B1 | 3/2004 | Barrett | |
| 6,760,324 | B1 | 7/2004 | Scott et al. | |
| 6,993,562 | B2 * | 1/2006 | Treptow et al. | 709/206 |
| 7,093,005 | B2 | 8/2006 | Patterson | |
| 7,103,647 | B2 | 9/2006 | Aziz | |
| 7,159,183 | B1 * | 1/2007 | Kudukoli et al. | 715/762 |
| 2002/0002611 | A1 | 1/2002 | Vange | |
| 2002/0052941 | A1 * | 5/2002 | Patterson | 709/223 |

(Continued)

OTHER PUBLICATIONS

Gurens, et al.; "Role based spedification and security analysis of cryptographic protocols using asynchronous product automata"; PRoceedings of the 13th International Workshop on Database and Expert Systems Applications (DEXA'02); 1529-4188/02 IEEE; Computer Science Society, 2002.
Noel; "New Roles Taking Shape in Enterprise IT Infrastructure"; A sponsored Supplemental to Software Magazine; Summer Edition, vol. 22, No. 2, pp. 25-32, 2002.
Raynal, F.; "Bastille Linux"; Multi-System & Internet Security Cookbook (Misc); 2000; www.security-labs.org.; Apr. 22, 2003.
Kyung et al., "An Agent-Manger Scheme for the Intergrated Transport Network Management", 1999, IEEE, 1017-1021.

*Primary Examiner*—Frantz B. Jean
(74) *Attorney, Agent, or Firm*—Lee & Hayes, PLLC

(57) ABSTRACT

A process determines a role that a target server will perform. The process also identifies at least one security policy associated with the role. The target server is then configured to implement the identified security policies.

29 Claims, 9 Drawing Sheets

U.S. PATENT DOCUMENTS

| | | | | |
|---|---|---|---|---|
| 2002/0161674 | A1 | 10/2002 | Scheer | |
| 2003/0050998 | A1 | 3/2003 | Garnett et al. | |
| 2003/0108108 | A1 | 6/2003 | Dujardin et al. | |
| 2003/0131078 | A1* | 7/2003 | Scheer et al. | 709/220 |
| 2003/0233431 | A1 | 12/2003 | Reddy et al. | |
| 2004/0010575 | A1* | 1/2004 | Wookey et al. | 709/223 |
| 2004/0031058 | A1 | 2/2004 | Reisman | |
| 2004/0034577 | A1* | 2/2004 | Van Hoose et al. | 705/28 |

* cited by examiner

300

```
- <SCWKnowledgeBase schemaLocation="W2k3.xsd">
  - <Roles>
      ...
    - <Role Type="Server">
        <Name>WEB</Name>
      - <Selected>
          <Maximum Value="FALSE" />
          <Typical Value="CUSTOM" FunctionName=
            "SvcapisServingWebPages" DLLName="scwhlp.dll" />
        </Selected>
    - <Services>
      - <Service>
          <Name>IISAdmin</Name>
        </Service>
    - <Service>
          <Name>HTTPFilter</Name>
        </Service>
    - <Service>
        <Name>W3SVC</Name>
      </Service>
    </Services>
  - <Ports>
    - <Port>
        <Name>HTTP</Name>
        <Type>Inbound</Type>
      </Port>
  - <Port>
        <Name>HTTPS</Name>
        <Type>Inbound</Type>
      </Port>
    </Ports>
  </Role>
</Roles>
```

```
- <Ports>
   ...
  - <Port>
      <Name>HTTP</Name>
      <Number>80</Number>
  - <Protocols>
    - <Protocol>
        <Name>TCP</Name>
      </Protocol>
    </Protocols>
  </Port>
- <Port>
      <Name>HTTPS</Name>
      <Number>443</Number>
  - <Protocols>
    - <Protocol>
        <Name>TCP</Name>
      </Protocol>
    </Protocols>
  </Port>
  </Ports>
</SCWKnowledgeBase>
```

```
- <Role Type="Server" SourceKB="W2k3.xml">
      <Name>WEB</Name>
      <Satisfiable>FALSE</Satisfiable>
      <Selected>FALSE</Selected>
  - <Services>
    - <Service>
        <Name>IISAdmin</Name>
      </Service>
    - <Service>
        <Name>HTTPFilter</Name>
      </Service>
    - <Service>
        <Name>W3SVC</Name>
      </Service>
    </Services>
  - <Ports>
    - <Port>
        <Name>HTTP</Name>
        <Type>Inbound</Type>
      </Port>
    - <Port>
        <Name>HTTPS</Name>
        <Type>Inbound</Type>
      </Port>
    </Ports>
  </Role>
```

```
- <SecurityPolicy>
  - <Extension ID="{A1D76559-8DB5-3F05-9821-
    B495A565076C}" Name="SCE">
      <Service Name="Alerter" StartupMode="Disabled" />
      <Service Name="browser" StartupMode="Disabled" />
      <Service Name="ComSysApp" StartupMode="Manual" />
      <Service Name="CryptSvc" StartupMode="Automatic" />
      <Service Name="EventLog" StartupMode="Automatic" />
      <Service Name="ProtectedStorage" StartupMode=
        "Automatic" />
      <Service Name="uploadmgr" StartupMode="Disabled" />
      ...
    </Extension>
- <Extension ID="{78A2BE03-EFE1-4695-96B8-33C477241BC9}"
  Name="IPSec">
  - <Filters Type="Destination">
    - <Interface>
        <IPAddress>157.59.132.0</IPAddress>
        <SubnetMask>255.255.252.0</SubnetMask>
    - <PortExemptions>
      - <Port>
          <Number>80</Number>
          <Type>Inbound</Type>
      - <Protocols>
          <Protocol>TCP</Protocol>
        </Protocols>
      </Port>
    - <Port>
        <Number>443</Number>
        <Type>Inbound</Type>
    - <Protocols>
        <Protocol>TCP</Protocol>
      </Protocols>
     </Port>
    </PortExemptions>
   </Interface>
  </Filters>
  <Permitted />
  <Trusted />
 - <DynamicExemptions>
    <Type>SUS</Type>
  </DynamicExemptions>
```

```
    - <ProtocolExemptions>
        <Type>ICMP</Type>
      </ProtocolExemptions>
    - <Security>
      - <Authentication>
          <Kerberos>Yes</Kerberos>
        </Authentication>
      </Security>
    </Extension>
- <PolicyAuthoringData>
  - <Extension ID="{43F65325-1C59-4748-A455-
    81F4146B209F}" Name="SCW">
      <PrototypeMachine Name="TEST" />
    - <Selection>
      - <Roles>
        - <Role>
            <Name>File</Name>
          </Role>
        - <Role>
            <Name>WEB</Name>
          </Role>
        - <Role>
            <Name>WindowsUpdate</Name>
          </Role>
        </Roles>
      - <Tasks>
        - <Task>
            <Name>Backup</Name>
          </Task>
        - <Task>
            <Name>ErrorReporting</Name>
          </Task>
        - <Task>
            <Name>RemotePrinting</Name>
          </Task>
        </Tasks>
      </Selection>
    </Extension>
  </PolicyAuthoringData>
</SecurityPolicy>
```

Fig. 6B

METHOD AND APPARATUS FOR CONFIGURING SERVERS

TECHNICAL FIELD

The systems and methods described herein relate to configuring one or more servers.

BACKGROUND

Different types of servers are used to perform a variety of tasks in, for example, a network environment. Example servers include file servers, print servers and web servers. A file server is a computing device and a storage device that stores files. Users on a network can store files to the file server and retrieve files from the file server. A print server is a computing device that manages one or more printers coupled to the print server or coupled to a common network. A web server is a computing device coupled to a network (e.g., the Internet) that delivers (i.e., serves up) web pages. A web server has an IP address and, in some cases, a domain name.

Servers are often dedicated such that they do not perform other tasks outside their server tasks. Certain servers may be capable of performing multiple tasks or functioning as multiple servers simultaneously (such as a file server and a print server).

Initially, a server needs to be configured to perform the various functions desired by a network administrator or other operator. Configuration of the server may also define certain operating characteristics, such as what types of user can access the server, how the server handles various types of requests, and what types of data should be encrypted by the server.

In existing systems, network administrators or other operators are responsible for configuring servers. Often, this configuration requires a significant amount of understanding and low-level control of the various operating characteristics. These manual tasks are time-consuming and may be redundant if the network administrator is configuring multiple servers that perform similar functions. In these situations, the "quality" of the server configuration is dependent on the knowledge and skill of the network administrator. If the network administrator is inexperienced at configuring servers, the server may not be configured in the best possible manner. Improper or inefficient server configuration may cause problems, such as poor server performance or inadequate server security.

Accordingly, there is a need for improved techniques for configuring one or more servers.

SUMMARY

The systems and methods described herein automate the process of configuring one or more servers. In one embodiment, a process determines a role that a target server will perform. The process then identifies at least one security policy associated with the role. The target server is then configured to implement the identified security policies.

BRIEF DESCRIPTION OF THE DRAWINGS

Similar reference numbers are used throughout the figures to reference like components and/or features.

FIGS. 3A and 3B illustrate data contained in a portion of an example knowledge base.

FIG. 5 illustrates an example of a Runtime XML file 500 generated by pre-processor 102.

FIGS. 6A and 6B illustrate an example of an Output XML file associated with one or more servers.

DETAILED DESCRIPTION

The systems and methods described herein allow an administrator to automatically configure one or more servers based on the role or roles that the server will be performing. When configuring a target server, the systems and methods described herein access data contained in a knowledge base along with user-supplied input regarding how the target server will be used. The knowledge base contains information regarding operating system and application parameters that need to be configured or analyzed from a security perspective. A configuration engine receives high-level configuration information and transforms that information into a native configuration language associated with the target server. The configuration engine also resolves various environment-specific variables, such as determining what domain controllers are associated with a particular server.

Various examples discussed herein refer to one or more servers. As used herein, a "server" is any computing device capable of performing functions defined by a particular server type. As discussed herein, a computing device may need to be configured to operate as a particular type of server. For example, a "file server" is any computing device capable of performing the functions and tasks defined by a file server role, such as receiving files, storing files and providing files to requesting devices. In particular embodiments, a "server" is a general purpose computer. A particular server may function as two or more servers simultaneously, such as a file server and a print server.

Particular examples discussed herein refer to configuration of a single server. However, the systems and methods discussed herein can be applied to the configuration of any number of servers. For example, if two servers are to be configured in similar ways, the two servers can be configured simultaneously by creating a transform that can be deployed simultaneously to configure two or more different servers.

As discussed herein, a particular server may be configured to perform one or more roles. A role defines, for example, a set of functions or tasks that the server performs. Example roles include a file server, a print server, a web server, a domain controller, a DNS server, an SMTP server and a terminal server. A file server role, for example, receives files, stores files and responds to file access requests. Various security parameters are associated with the different roles. For example, roles may have associated security parameters relating to account login policies, event log settings, port filtering policies, Internet Protocol Security (IPSec) policies and security-related registry values. Additional details regarding roles are provided below.

Figure 1:
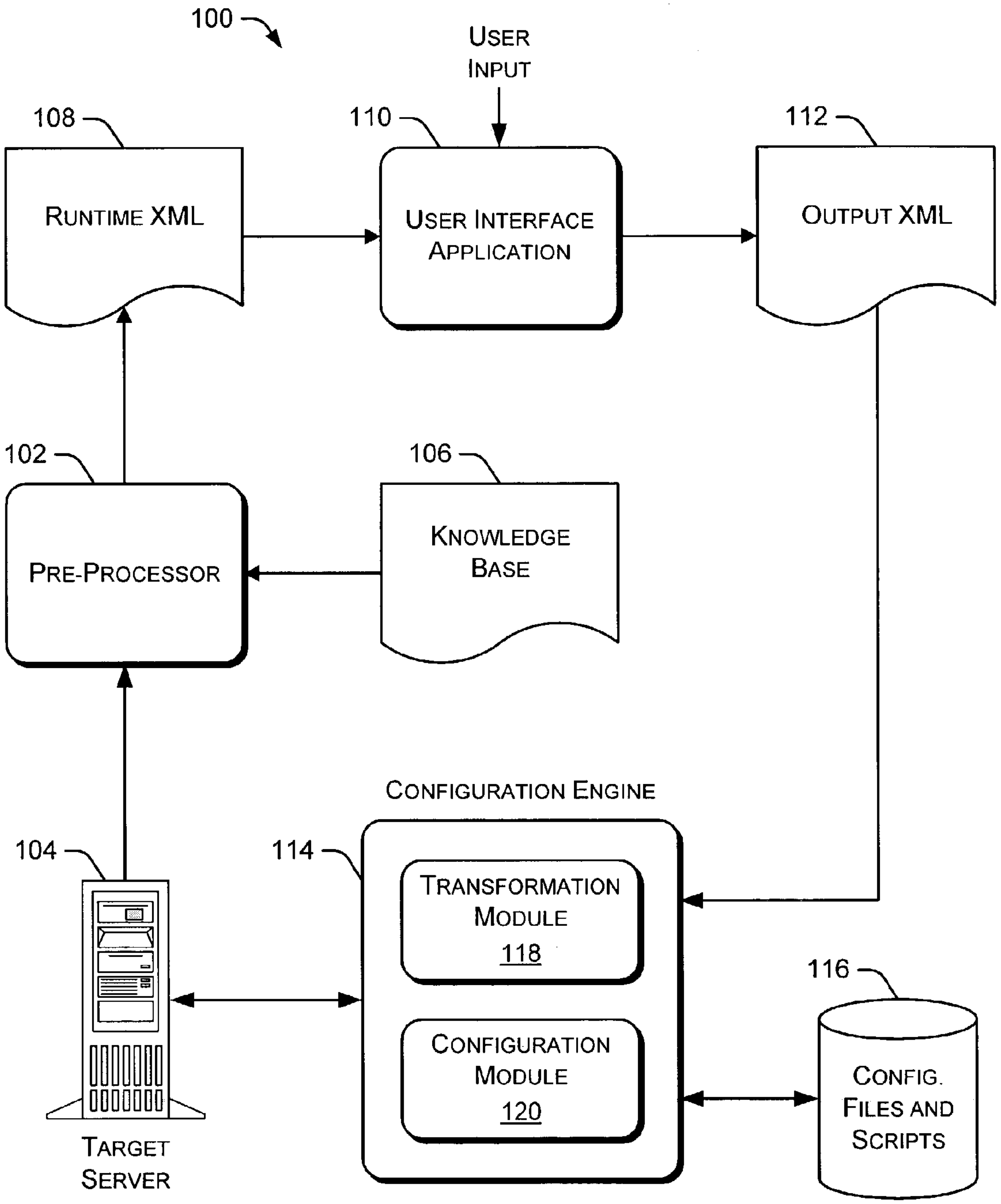
FIG. 1 is a block diagram illustrating an example architecture capable of configuring one or more servers.

FIG. 1 is a block diagram illustrating an example architecture 100 capable of configuring one or more servers. A pre-processor 102 is coupled to a target server 104. Target server 104 is a server being configured or re-configured. Pre-processor 102 obtains information from target server 104, such as how the target server is currently configured, the types of roles that the target server is able to perform, etc. Pre-processor 102 also retrieves information from a knowledge base 106. Knowledge base 106 is an Extensible Markup Language (XML) file that identifies operating system and application parameters that need to be configured or analyzed from a security perspective. The information in knowledge base 106 is abstracted into functional terms that are more easily understood by network administrators who are not necessarily server or security experts. Knowledge base 106 also contains user interface directives that help determine the default values rendered by the user interface under various circumstances. Additionally, knowledge base 106 defines mappings between abstractions (e.g., roles) defined in the user interface and the underlying settings (e.g., services).

In a particular implementation, target server 104 is not actually configured. Instead, target server 104 is merely used to assist a user in creating a policy for a system similar to the target server. The target server assists the user by causing the filtering out of information in the knowledge base that doesn't apply to the environment for which the user is creating a policy. In an alternate embodiment, a target server is not used to generate a policy. In this embodiment, the user has access to all data in the knowledge base.

Pre-processor 102 creates a run-time specific knowledge base, which is referred to in FIG. 1 as a Runtime XML 108. Runtime XML 108 is created by comparing the raw knowledge base data 106 to the current state of target system 104. By pre-processing the knowledge base data 106, a user interface application 110 (which receives Runtime XML 108) is able to render more appropriate information and start with more accurate details. For example, if particular roles cannot be supported by target server 104, Runtime XML 108 can indicate those unavailable roles such that user interface application 110 does not offer those unavailable roles to the network administrator for selection by default. Additionally, pre-processor 102 identifies other information that is not contained in the knowledge base, such as network configuration information (e.g., network interface cards and IP addresses on the target server). This information is provided to user interface application 110.

In a particular embodiment, Runtime XML 108 contains all of the data from knowledge base 106, but the data elements are "tagged" to indicate whether the particular elements (e.g., particular roles) are supported by target server 104. An example tag is: <Satisfiable> TRUE </Satisfiable> In another embodiment, the data elements that are not supported by target server 104 are filtered out by pre-processor 102 such that they are not included in Runtime XML 108.

Runtime XML 108 is provided to user interface application 110, which obtains additional input about the desired configuration of target server 104 from a network administrator or other individual. Using the data in Runtime XML 108, user interface application 110 is able to restrict the options and configuration information requested from the network administrator to those options and configuration information that are relevant to target server 104. For example, if target server 104 is not capable of functioning as a DNS server, then user interface application 110 does not present that option to the network administrator. Additionally, if user interface application 110 identifies the operating system (OS) level of target server 104 (e.g., by querying the target server), the knowledge base data can be consulted to determine the set of security levels supported by the target server's OS. Thus, user interface application 110 utilizes information from knowledge base 106 and knowledge of the current state of target server 104 to solicit functional server requirements from the network administrator and generate a resulting security policy (shown in FIG. 1 as an Output XML 112).

Output XML 112 is provided to a configuration engine 114 that is coupled to target server 104. Configuration engine 114 (also referred to as a "back-end engine") provides a framework and a set of components, a transformation module 118 and a configuration module 120, that can transform Output XML 112 generated by user interface application 110 into native scripts and configuration files. These native scripts and configuration files are stored temporarily or permanently on a data storage device 116 coupled to configuration engine 114. The native scripts and configuration files are subsequently applied to target server 104 during a configuration phase. Configuration engine 114 also enables or disables various services, as needed, to implement the roles selected by the user through user interface application 110. Configuration engine 114 also supports rollback and analysis operations in addition to configuration operations. Rollback is a flag that can be passed to a "back-end" transformation or application engine. A rollback transformation compares the configuration policy to the current state of the system and stores the current values for the changes that would be made if the policy were applied.

Analysis operations determine whether a system is in compliance with a particular policy. For example, if an output policy indicates "disable service x", the analysis operations will generate a warning if service x is enabled. The primary difference between the analysis operations and rollback is their outputs. The rollback output needs to be resubmitted to the configuration engine and the analysis operation output needs to be viewable in a user interface.

Transformation module 118 (in configuration engine 114) transforms the data in Output XML 112 into native scripts and configuration files. Output XML 112 is typically a high-level policy written in XML. Transformation module 118 transforms the high-level policy to native scripts and configuration files that can be understood by target server 104. Configuration module 120 applies one or more policies (defined by native scripts and configuration files) to target server 104, thereby configuring the target server. The transformation performed by transformation module 118 is similar to the compilation function performed by a compiler to convert source code into object code for a particular processor architecture. Output XML 112 is similar to the source code and the resulting native scripts and configuration files are created for a particular architecture (the target server).

In one embodiment, Output XML 112 represents a high-level policy that will be applied to the target server 104. The high-level policy is transformed into a more specific file customized for target server 104. This high-level policy can be applied to multiple different target servers, in which case a separate customized file is created for each target server. Although the high-level policy is the same, the separate customized files may differ due to differences in the target servers.

Although FIG. 1 illustrates a single knowledge base 106, a particular embodiment may include multiple knowledge bases coupled to pre-processor 102. In this embodiment, one knowledge base is the standard knowledge base containing information regarding standard server roles. Another knowledge base may define roles developed and supported by a third party. For example, a third party may define one or more roles associated with a database server. This use of multiple knowledge bases allows one knowledge base to be updated without affecting the other knowledge bases. Additionally, a user (such as a network administrator) may create their own knowledge base containing one or more role definitions. In one embodiment, these user-created role definitions replace any definitions of roles of the same name in knowledge base 106.

Although particular examples discussed herein refer to a target server, alternate embodiments can configure a server without having any previous knowledge of the server's current configuration or capabilities. In these alternate embodiments, the systems and methods may presume that the server is capable of performing any role.

Figure 2:
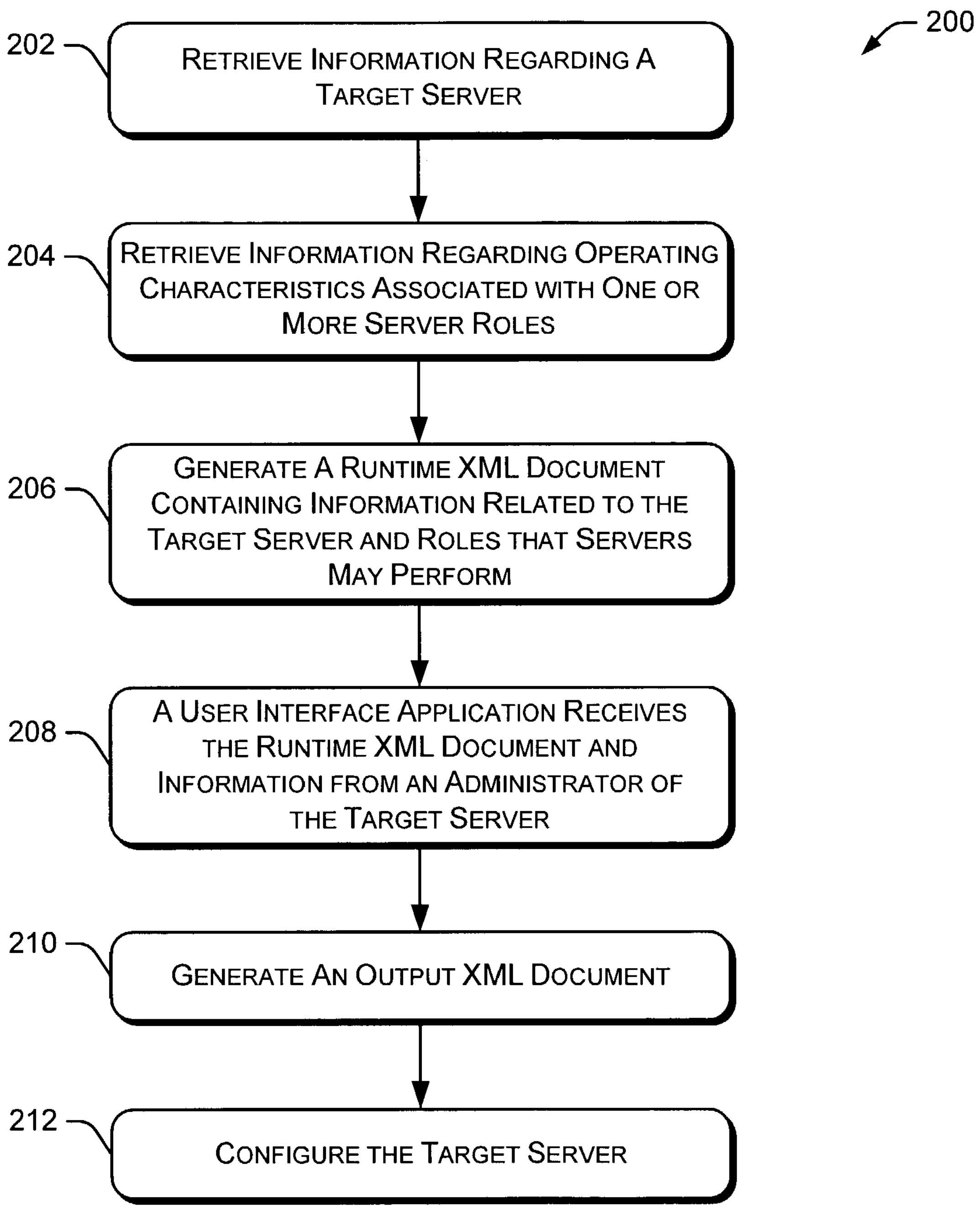
FIG. 2 is a flow diagram illustrating an embodiment of a procedure for configuring a server using the architecture of FIG. 1.

FIG. 2 is a flow diagram illustrating an embodiment of a procedure 200 for configuring a server using the architecture of FIG. 1. Initially, procedure 200 retrieves information regarding a target server (block 202). This information includes, for example, the target server's features, capabilities, and current configuration. The procedure then retrieves information regarding operating characteristics associated with one or more server roles (block 204). These operating characteristics include, for example, services used by various roles, communication ports used by various roles and Internet Information Server (IIS) requirements. The operating characteristics may also include rules for determining whether or not the role is likely being performed.

Procedure 200 continues by generating a Runtime XML document that contains information related to the target server and various roles that servers may perform (block 206). A user interface application then receives the Runtime XML document and obtains additional information from an administrator of the target server or another person (block 208). The procedure then generates an Output XML document (block 210) that contains the high level security policy for the target server or other similarly configured servers.

FIGS. 3A and 3B illustrate data 300 contained in a portion of an example knowledge base. As shown, various roles, services, ports and protocols are identified and defined. For example, a role named "WEB" has an associated type of "Server". Three different services are identified: "IISAdmin", "HTTPFilter" and "W3SVC". Additionally, two ports are identified: "HTTP" and "HTTPS". The data 300 also identifies a protocol (TCP). The port "HTTPS" has an associated port number of "443" and uses the TCP protocol. The knowledge base data shown in FIGS. 3A and 3B is abbreviated for purposes of explanation. A particular knowledge base may identify and define any number of roles, services, ports, protocols and other information. A knowledge base entry may also indicate the direction of a required network communication (such as inbound or outbound). For example, a Web Server role requires port 80 to be opened for inbound communication, but a Web Client role would require port 80 to be opened for outbound communication.

Figure 4:
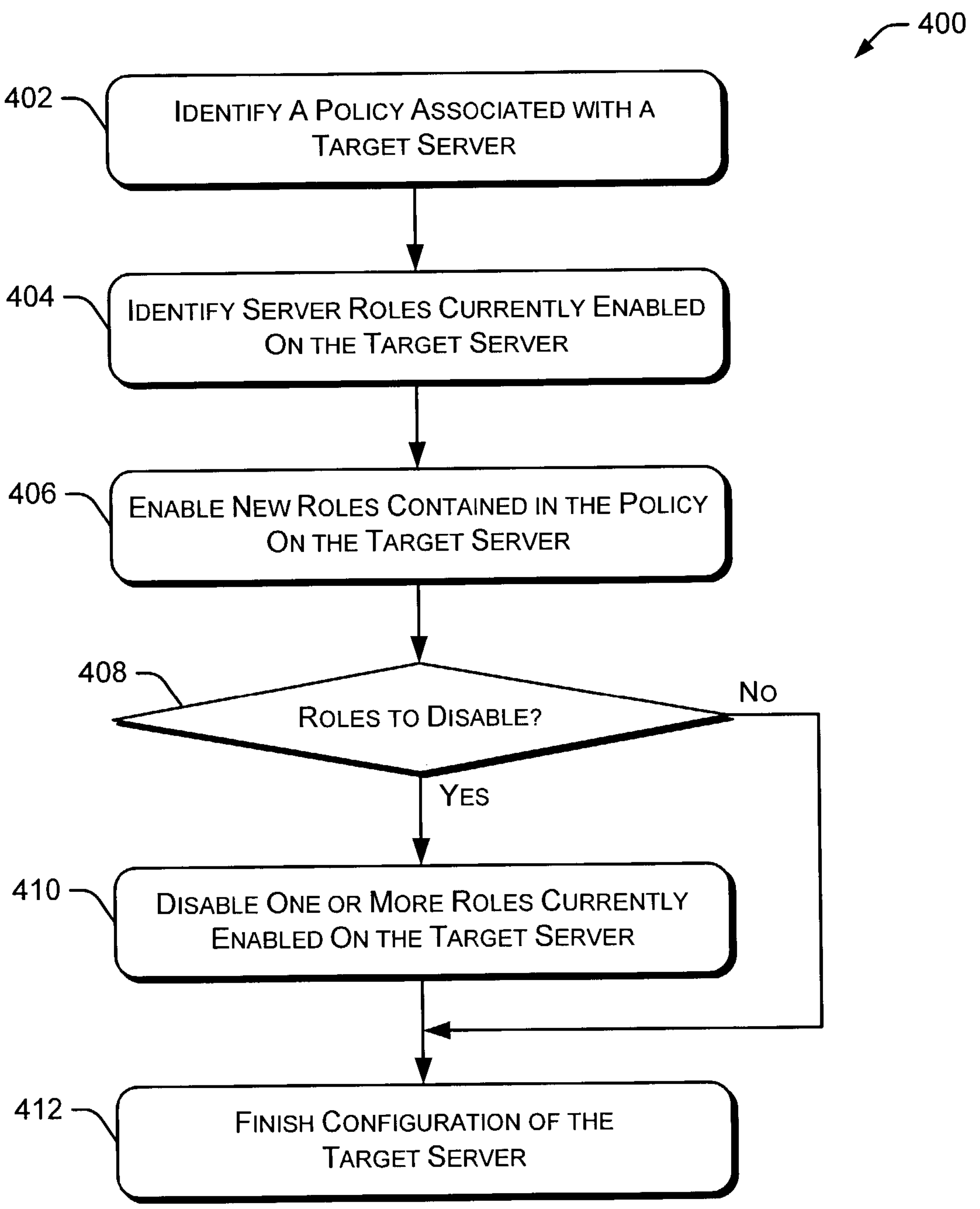
FIG. 4 is a flow diagram illustrating an embodiment of a procedure for configuring a server.

FIG. 4 is a flow diagram illustrating an embodiment of a procedure 400 for configuring a server. Initially, procedure 400 identifies a policy associated with a target server (block 402). The identified policy includes one or more roles that the target server is to perform. Additionally, the identified policy may include one or more roles that the target server is not to perform. Other policies may include one or more roles that the target server is to perform in addition to any roles currently enabled on the target server.

The procedure continues by identifying one or more server roles currently is enabled on the target server (block 404). A particular target server may have previously been acting as a server and, therefore, has certain server roles enabled. Procedure 400 enables the new roles contained in the policy on the target server (block 406). The procedure then determines whether any of the currently enabled roles on the target server should be disabled (block 408). This determination is based on information contained in the policy associated with the target server, such as "disable all other server roles" or "disable any file server or web server roles". If one or more roles on the target server need to be disabled, those roles are disabled at block 410. Finally, the procedure finishes configuration of the target server (block 412).

FIG. 5 illustrates an example of a Runtime XML file 500 generated by pre-processor 102. For the Runtime XML file 500, the pre-processor sets the <satisfiable> element and the <selected> element for each role. "Satisfiability" is determined by whether or not the target system (e.g., the target server) has all the required services for the corresponding role. "Selected" is determined by different methods that may depend on how aggressive the user is with the security policy, the type of role and any custom functions that can be invoked. The pre-processor can also provide role-independent information such as the IP addresses associated with the target system and the OS version of the target system.

FIGS. 6A and 6B illustrate an example of an Output XML file 600 associated with one or more servers. "Service Names" are the services that make up a particular role. For example, a Web Server Role needs the HTTPfilter, IISAdmin, and W3SVC services. In the example of FIGS. 6A and 6B, only a few Service Names are shown. A particular Output XML file may include any number of Service Names.

Based on the roles that are selected, the corresponding Service Names are enabled and the remaining services are disabled, thereby improving the security of the system. Since each active service provides a potential area for security failures, reducing the number of active services enhances security. "Extension IDs" inform the configuration engine what extension understands the data contained therein. For example, IPSec data can be passed to the IPSec extension for processing. "Filters" define the interface on which the packet filtering process will be implemented. "Port exemptions" and "Dynamic exemptions" identify the traffic that is allowed through the associated filter.

The following is an example of a transformed version of the Output XML file. This transformed version is generated by transformation module 118 and applied to a target server.

```
ipsec
static
set store location=local
delete rule all "SCW Policy"
delete policy name="SCW Policy"
delete filteraction name="$SCW$_Block"
delete filteraction name="$SCW$_Permit"
delete filteraction name="$SCW$_Require-Hi"
delete filteraction name="$SCW$_Require-Lo"
delete filteraction name="$SCW$_Request-Hi"
delete filteraction name="$SCW$_Request-Lo"
delete filterlist name="$SCW$_DefaultDeny"
```

-continued

```
delete filterlist name="$SCW$__InboundPortExemptions"
delete filterlist name="$SCW$__OutboundPortExemptions"
delete filterlist name="$SCW$__InboundAttackVector"
delete filterlist name="$SCW$__MachineExemptions"
delete filterlist name="$SCW$__TrustedGroup1"
delete filterlist name="$SCW$__TrustedGroup2"
delete filterlist name="$SCW$__TrustedGroup3"
delete filterlist name="$SCW$__TrustedGroup4"
delete filterlist name="$SCW$__DynamicExemptions"
delete filterlist name="$SCW$__ProtocolExemptions"
add policy name="SCW Policy" description="Security Configuration
Wizard Policy" activatedefaultrule=no assign=no
add filteraction name="$SCW$__Block" description="Discard"
action=block
add filteraction name="$SCW$__Permit" description="Pass without
modification or security" action=permit
add filteraction name="$SCW$__Require-Hi" description="Negotiate, No
Fallback, No Inpass" inpass=no soft=No action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
add filteraction name="$SCW$__Require-Lo" description="Negotiate, No
Fallback, Inpass" inpass=yes soft=No action=negotiate qmsec="AH[SHA1]+
ESP[None,SHA1] AH[MD5] +ESP[None,SHA1] AH[SHA1]+ESP[None,MD5]
AH[MD5]+ESP[None,MD5] ESP[None,SHA1] ESP[None,MD5] AH[SHA1]
AH[MD5] "
add filteraction name="$SCW$__Request-Hi" description="Negotiate,
Fallback, No Inpass" inpass=no soft=Yes action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
add filteraction name="$SCW$__Request-Lo" description="Negotiate,
Fallback, Inpass" inpass=yes soft=Yes action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
add filterlist name="$SCW$__DefaultDeny" description="Traffic to be
blocked"
add filterlist name="$SCW$__InboundPortExemptions" description="Ports
to permit (Inbound)"
add filterlist name="$SCW$__OutboundPortExemptions"
description="Ports to permit (Outbound)"
add filterlist name="$SCW$__InboundAttackVector" description="Mitigate
holes opened by outbound communication requirement"
add filterlist name="$SCW$__MachineExemptions" description="Machines
or Subnets to Permit"
add filterlist name="$SCW$__TrustedGroup1" description="Machines or
Subnets to Require Security with Hi"
add filterlist name="$SCW$__TrustedGroup2" description="Machines or
Subnets to Require Security with Lo"
add filterlist name="$SCW$__TrustedGroup3" description="Machines or
Subnets to Request Security with Hi"
add filterlist name="$SCW$__TrustedGroup4" description="Machines or
Subnets to Request Security with Lo"
add filterlist name="$SCW$__DynamicExemptions"
description="Infrastructure Traffic"
add filterlist name="$SCW$__ProtocolExemptions" description="IP
Protocols to Permit"
add filter filterlist="$SCW$__DefaultDeny" dstaddr=157.59.132.0
srcaddr=any description="any to me/IP" protocol=ANY mirrored=yes
srcmask=255.255.255.255 dstmask=255.255.252.0
add filter filterlist="$SCW$__InboundPortExemptions"
dstaddr=157.59.132.0 srcaddr=any description="any to me/IP" protocol=TCP
mirrored=yes srcmask=255.255.255.255 dstmask=255.255.252.0 dstport=80
srcport=0
add filter filterlist="$SCW$__InboundPortExemptions"
dstaddr=157.59.132.0 srcaddr=any description="any to me/IP" protocol=TCP
mirrored=yes srcmask=255.255.255.255 dstmask=255.255.252.0 dstport=443
srcport=0
add filter filterlist="$SCW$__ProtocolExemptions" dstaddr=me srcaddr=any
description="Protocol filter" protocol=ICMP mirrored=yes
srcmask=255.255.255.255 dstmask=255.255.255.255
add rule name="$SCW$__Block__DefaultDeny" policy="SCW Policy"
filterlist="$SCW$__DefaultDeny" filteraction="$SCW$__Block" activate=yes
add rule name="$SCW$__Permit__InboundPortExemptions" policy="SCW
Policy" filterlist="$SCW$__InboundPortExemptions" filteraction=
"$SCW$__Permit" activate=yes
add rule name="$SCW$__Permit__OutboundPortExemptions" policy="SCW
Policy" filterlist="$SCW$__OutboundPortExemptions"
```

-continued

```
filteraction="$SCW$_Permit" activate=yes
    add rule name="$SCW$_MitigateInboundAttackVector" policy="SCW
Policy" filterlist="$SCW$_InboundAttackVector" filteraction="$SCW$_Block"
activate=yes
    add rule name="$SCW$_Permit_MachineExemptions" policy="SCW
Policy" filterlist="$SCW$_MachineExemptions" filteraction="$SCW$_Permit"
activate=yes
    add rule name="$SCW$_Require-Hi_TrustedGroup1" policy="SCW
Policy" filterlist="$SCW$_TrustedGroup1" filteraction="$SCW$_Require-Hi"
activate=yes kerberos=Yes
    add rule name="$SCW$_Require-Lo_TrustedGroup2" policy="SCW
Policy" filterlist="$SCW$_TrustedGroup2" filteraction="$SCW$_Require-Lo"
activate=yes kerberos=Yes
    add rule name="$SCW$_Request-Hi_TrustedGroup3" policy="SCW
Policy" filterlist="$SCW$_TrustedGroup3" filteraction="$SCW$_Request-Hi"
activate=yes kerberos=Yes
    add rule name="$SCW$_Request-Lo_TrustedGroup4" policy="SCW
Policy" filterlist="$SCW$_TrustedGroup4" filteraction="$SCW$_Request-Lo"
activate=yes kerberos=Yes
    add rule name="$SCW$_Permit_DynamicExemptions" policy="SCW
Policy" filterlist="$SCW$_DynamicExemptions" filteraction="$SCW$_Permit"
activate=yes
    add rule name="$SCW$_Permit_ProtocolExemptions" policy="SCW
Policy" filterlist="$SCW$_ProtocolExemptions" filteraction="$SCW$ Permit"
activate=yes
    set policy name="SCW Policy" assign=y
```

The above transformed version of the Output XML file contains various settings and other information used to configure the target server. An IPSec filter describes a subset of network traffic in terms of five parameters: SA (Source Address), DA (Destination Address), SP (Source Port), DP (Destination Port), and Protocol. A Filter List includes one or more such filters that may describe a larger subset of traffic that can trigger a specific filter action, such as Block or Permit. Rules associate filter lists with filter actions.

Figure 7:
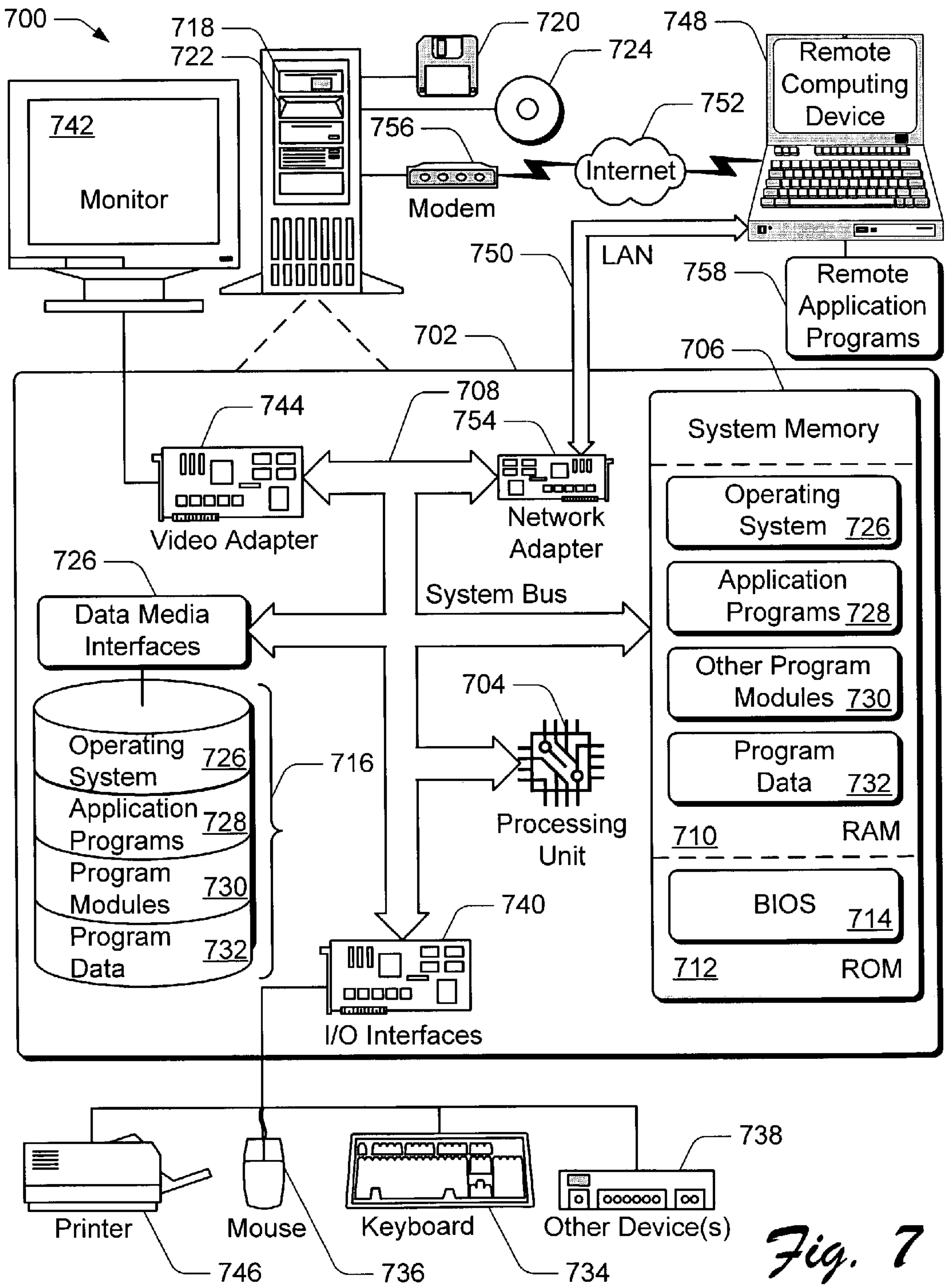
FIG. 7 illustrates an example of a computing environment.

FIG. 7 illustrates an example of a computing environment 700 within which the server configuration systems and methods, can be either fully or partially implemented. Example computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the example computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, but are not limited to, one or more processors 704 (e.g., any of microprocessors, controllers, and the like), a system memory 706, and a system bus 708 that couples various system components including the processor 704 to the system memory 706. The one or more processors 704 process various computer-executable instructions to control the operation of computing device 702 and to communicate with other electronic and computing devices.

The system bus 708 represents any number of several types of bus or switching structures, including a memory bus or memory controller, point-to-point connections, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 700 typically includes a variety of computer-readable media. Such media can be any available media that is accessible by computing device 702 and includes both volatile and non-volatile media, removable and non-removable media. The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computing device 702, such as during start-up, is stored in ROM 712. RAM 710 typically contains data and/or program modules that are immediately accessible to and/or presently operated on by the processing unit 704.

Computing device 702 can also include other removable/non-removable, volatile/non-volatile computer storage media. By way of example, a hard disk drive 716 is included for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD, or any other type of optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer-readable instructions, data structures, program modules, and other data for computing device 702. Although the example illustrates a hard disk 716, a removable magnetic disk 720, and a removable optical disk 724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of the systems and methods for a test instantiation system.

Computing device 702 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 702 via input devices such as a keyboard 734 and a pointing device 736 (e.g., a "mouse"). Other input devices 738 (not shown specifically) may include a microphone, joystick, game pad, controller, satellite dish, serial port, scanner, and/or the like. These and other input devices are connected to the processing unit 704 via input/output interfaces 740 that are coupled to the system bus 708, but may be connected by other interface and bus structures, such as a parallel port, game port, and/or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computing device 702 via the input/output interfaces 740.

Computing device 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computing device 702.

Logical connections between computing device 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computing device 702 is connected to a local network 750 via a network interface or adapter 754. When implemented in a WAN networking environment, the computing device 702 typically includes a modem 756 or other means for establishing communications over the wide network 752. The modem 756, which can be internal or external to computing device 702, can be connected to the system bus 708 via the input/output interfaces 740 or other appropriate mechanisms. It is to be appreciated that the illustrated network connections are exemplary and that other means of establishing communication link(s) between the computing devices 702 and 748 can be employed.

In a networked environment, such as that illustrated with computing environment 700, program modules depicted relative to the computing device 702, or portions thereof, may be stored in a remote memory storage device. By way of example, remote application programs 758 reside on a memory device of remote computing device 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

Particular examples discussed herein relate to creating a security policy and configuring a server with that security policy. Similar procedures can be used to modify existing security policies, apply an existing security policy to another server, or analyze a server for compliance with a particular security policy.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:

determining a role that a target server will perform;

identifying at least one security policy associated with the role, wherein identifying the at least one security policy includes:

accessing a knowledge base containing security parameters associated with roles that a server might perform; and identifying services and communication ports used by roles that a server might perfom;

configuring the target server to implement the identified security policy, wherein configuring the target server includes:

generating a target server policy based on the role and the security policy associated with the role; and applying the target server policy to the target server.

2. A method as recited in claim 1 further comprising identifying the target server prior to determining a role that the target server will perform.

3. A method as recited in claim 2 wherein the role is a file server.

4. A method as recited in claim 1 further comprising determining a plurality of roles that the target server will perform.

5. A method as recited in claim 4 wherein the role is a web server.

6. A method as recited in claim 1 wherein the role is a domain controller.

7. A method as recited in claim 1 wherein the role has a plurality of associated ports.

8. A method as recited in claim 1 further comprising identifying operating characteristics associated with the role.

9. A method as recited in claim 8 wherein the role has a plurality of associated services.

10. A method as recited in claim 1 wherein configuring the target system includes configuring a plurality of target systems.

11. One or more computer-readable memories containing a computer program that is executable by a processor to perform the method recited in claim 1.

12. A method comprising:

identifying a target server;

determining at least one role that the target server is able to perform;

identifying operating characteristics associated with the role that the target server is able to perform, wherein identifying the operating characteristics includes:

identifying security services used by the role; and identifying communication ports used by the role;

identifying a particular role to be performed by the target server; and configuring the target server based on the particular role to be performed by the target server and the operating characteristics associated with the particular role.

13. A method as recited in claim 12 wherein the operating characteristics associated with the role that the target server is able to perform are security characteristics.

14. A method as recited in claim 12 wherein identifying operating characteristics associated with the role that the target server is able to perform includes tagging operating characteristics retrieved from a knowledge base.

15. A method as recited in claim 12 wherein the knowledge base contains security parameters associated with the at least one role that the target server is able to perform.

16. One or more computer-readable memories containing a computer program that is executable by a processor to perform the method recited in claim 12.

17. A method comprising:

identifying a target server;

identifying operating characteristics associated with possible server roles;

tagging operating characteristics associated with one or more roles that the target server is capable of performing;

identifying a role that the target server will perform; and configuring the target server to perform the identified role, wherein configuring the target server includes:

generating a target server policy based on the identified role; and applying the target server policy to the target server.

18. A method as recited in claim 17 wherein configuring the target server to perform the identified role is based on the operating characteristics associated with the identified role.

19. A method as recited in claim 17 wherein identifying operating characteristics associated with possible server roles includes accessing a knowledge base containing security parameters associated with the possible server roles.

20. A method as recited in claim 17 wherein identifying operating characteristics associated with possible server roles includes identifying services used by possible server roles.

21. A method as recited in claim 17 wherein identifying operating characteristics associated with possible server roles includes identifying communication ports used by possible server roles.

22. An apparatus comprising:

means for determining one or more roles that a target server is able to perform;

means for identifying operating characteristics associated with the plurality of roles that the target server is able to perform;

means for identifying a particular role to be performed by the target server;

means for configuring the target server based on the particular role to be performed by the target server and operating characteristics associated with the particular role;

means for identifying a plurality of services associated with the particular role; and means for identifying a plurality of ports associated with the particular role.

23. An apparatus as recited in claim 22 wherein the operating characteristics include security-related characteristics.

24. An apparatus comprising:

a knowledge base containing characteristics associated with a plurality of server roles;

a pre-processor coupled to the knowledge base and configured to identify characteristics of a target server coupled to the pre-processor; and a configuration engine coupled to the pre-processor, the configuration engine is to apply configuration information to the target server, and wherein the configuration information includes at least one service associated with a server role to be performed by the target server and at least one port associated with a server role to be performed by the target server.

25. An apparatus as recited in claim 24 wherein the pre-processor is further configured to identify server roles enabled on the target server.

26. An apparatus as recited in claim 24 further comprising a user interface application coupled to the pre-processor, wherein the user interface application generates data used by the configuration engine to configure the target server.

27. An apparatus as recited in claim 24 wherein the knowledge base is an XML document.

28. One or more computer-readable media having stored thereon a computer program that, when executed by one or more processors, causes the one or more processors to:

retrieve data associated with one or more server roles from a knowledge base;

determine one or more roles that a target server is capable of performing, wherein the one or more roles that the target server is capable of performing have:

at least one associated service; and at least one associated port;

obtain user preferences regarding at least one role to be implemented by the target server; and configure the target server based on data associated with the at least one role.

29. One or more computer-readable media as recited in claim 28 wherein the data associated with the one or more roles that a target server is capable of performing includes security services used by the one or more roles.

* * * * *